United States Patent
Krahl et al.

(10) Patent No.: US 11,505,170 B2
(45) Date of Patent: Nov. 22, 2022

(54) HOUSING FOR AN ELECTROPNEUMATIC MODULATOR FOR AN ELECTROPNEUMATIC BRAKE SYSTEM FOR A VEHICLE, ELECTROPNEUMATIC MODULATOR HAVING A HOUSING, AND METHOD FOR PRODUCING AN ELECTROPNEUMATIC MODULATOR

(71) Applicant: Knorr-Bremse Systeme Fuer Nutzfahrzeuge GmbH, Munich (DE)

(72) Inventors: Martin Krahl, Ludwigsburg (DE); Friedbert Roether, Cleebronn (DE)

(73) Assignee: KNORR-BREMSE SYSTEME FUER NUTZFAHRZEUGE GMBH, Munich (DE)

(*) Notice: Subject to any disclaimer, the term of this patent is extended or adjusted under 35 U.S.C. 154(b) by 0 days.

(21) Appl. No.: 17/272,572

(22) PCT Filed: Aug. 2, 2019

(86) PCT No.: PCT/EP2019/070882
§ 371 (c)(1),
(2) Date: Mar. 1, 2021

(87) PCT Pub. No.: WO2020/048698
PCT Pub. Date: Mar. 12, 2020

(65) Prior Publication Data
US 2021/0354674 A1    Nov. 18, 2021

(30) Foreign Application Priority Data
Sep. 6, 2018    (DE) .................... 10 2018 121 721.8

(51) Int. Cl.
*B60T 13/68* (2006.01)
*B60T 15/02* (2006.01)
*B60T 17/00* (2006.01)

(52) U.S. Cl.
CPC .......... *B60T 13/683* (2013.01); *B60T 15/027* (2013.01); *B60T 17/00* (2013.01); *B60T 17/008* (2013.01)

(58) Field of Classification Search
CPC ....... B60T 13/683; B60T 15/027; B60T 17/00
(Continued)

(56) References Cited

U.S. PATENT DOCUMENTS

| | | | |
|---|---|---|---|
| 3,758,167 A | 9/1973 | Machek | |
| 4,418,965 A | * | 12/1983 | Reinecke .............. B60T 8/1881 303/22.4 |

(Continued)

FOREIGN PATENT DOCUMENTS

| | | |
|---|---|---|
| CN | 101201086 A | 6/2008 |
| CN | 101275594 A | 10/2008 |

(Continued)

OTHER PUBLICATIONS

International Search Report dated Oct. 28, 2019 for PCT/EP2019/070882.

*Primary Examiner* — Robert A. Siconolfi
*Assistant Examiner* — San M Aung
(74) *Attorney, Agent, or Firm* — Norton Rose Fulbright US LLP; Gerard Messina (57) ABSTRACT

A housing for an electropneumatic modulator for an electropneumatic brake system for a vehicle, includes: an electric chamber configured to receive at least one electrical and/or electronic component of the electropneumatic modulator from a first side of the housing; and a receptacle chamber which is arranged opposite the electric chamber and is configured so as to receive a relay piston and a guide device for guiding the relay piston from a second side, opposite the first side, of the housing, in which the housing is formed in one piece. Also described are a related elec- (Continued)

tropneumatic modulator and a method for making the electropneumatic modulator.

10 Claims, 7 Drawing Sheets

(58) Field of Classification Search
USPC .............................. 188/152; 303/3, 40, 118.1
See application file for complete search history.

(56) References Cited

U.S. PATENT DOCUMENTS

| | | | |
|---|---|---|---|
| 6,206,481 B1 | 3/2001 | Kaisers et al. | |
| 6,247,764 B1* | 6/2001 | Koelzer | B60T 17/18 |
| | | | 303/118.1 |
| 6,386,649 B1* | 5/2002 | Ross | B60T 8/361 |
| | | | 303/119.2 |
| 2004/0195913 A1* | 10/2004 | Roether | B60T 13/683 |
| | | | 303/118.1 |
| 2004/0232367 A1* | 11/2004 | Roether | B60T 15/18 |
| | | | 251/30.01 |

FOREIGN PATENT DOCUMENTS

| | | |
|---|---|---|
| CN | 105358800 A | 2/2016 |
| CN | 106660539 A | 5/2017 |
| DE | 3841749 A1 | 6/1990 |
| DE | 4226697 C1 | 9/1993 |
| DE | 19508822 A1 | 9/1996 |
| DE | 19510492 A1 | 9/1996 |
| DE | 19605562 A1 | 8/1997 |
| DE | 19609222 A1 | 9/1997 |
| DE | 102014009179 A1 | 12/2015 |
| EP | 2794373 A1 | 10/2014 |
| JP | 2000506804 A | 6/2000 |
| JP | 2004530589 A | 10/2007 |
| JP | 4255038 B2 | 4/2009 |

* cited by examiner

HOUSING FOR AN ELECTROPNEUMATIC MODULATOR FOR AN ELECTROPNEUMATIC BRAKE SYSTEM FOR A VEHICLE, ELECTROPNEUMATIC MODULATOR HAVING A HOUSING, AND METHOD FOR PRODUCING AN ELECTROPNEUMATIC MODULATOR

FIELD OF THE INVENTION

The present approach relates to a housing for an electropneumatic modulator for an electropneumatic brake system for a vehicle, to an electropneumatic modulator having a housing and to a method for producing an electropneumatic modulator.

BACKGROUND INFORMATION

Electropneumatic modulators for electropneumatic brake systems have a multiplicity of electrical and/or electronic components as well as a multiplicity of internal functional parts such as a relay piston. The components of the electropneumatic modulator are received in their entirety in a multi-part housing with seals therebetween.

SUMMARY OF THE INVENTION

Against this background, an object of the present approach is to provide an improved housing for an electropneumatic modulator for an electropneumatic brake system for a vehicle, an electropneumatic modulator with an improved housing and a method for producing an improved electropneumatic modulator.

This object may be achieved by a housing for an electropneumatic modulator for an electropneumatic brake system for a vehicle, an electropneumatic modulator with a housing and a method for producing an electropneumatic modulator according to the main claims.

The advantages which can be achieved with the presented approach consist in the fact that a housing for an electropneumatic modulator is provided, which housing permits very simple mounting of the electropneumatic modulator by virtue of the use of only a very small number of mounting parts and components. This advantageously permits a significant overall saving in terms of cost, expenditure and time when carrying out mounting.

A housing for an electropneumatic modulator for an electropneumatic brake system for a vehicle has an electric chamber and a receptacle chamber. The electric chamber is formed so as to receive at least one electrical and additionally or alternatively electronic component of the electropneumatic modulator from a first side of the housing. The receptacle chamber is arranged opposite the electric chamber and is formed so as to receive a relay piston and a guide device for guiding the relay piston from a second side, opposite the first side, of the housing. The housing is formed in one piece.

An electropneumatic modulator is to be understood as being a pressure regulating module of an electropneumatic brake system. This pressure regulating module regulates a provided pneumatic brake pressure, that is to say compressed air, during a braking process, for example of at least one vehicle wheel of a vehicle. The electrical and additionally or alternatively electronic component of the electropneumatic modulator can be a circuit board, at least one solenoid valve, a pressure sensor and additionally or alternatively a pressure tube. The solenoid valve can be activated using a control signal. The relay piston and the guide device are also part of the electropneumatic modulator, wherein the guide device can have an inlet seat ring, a collar, a collar spring and additionally or alternatively a securing insert with an integrated guide sleeve. The functionality of the electropneumatic modulator can correspond to a functionality of known electropneumatic modulators which are used in conjunction with brake systems. A housing which is presented here advantageously permits all the components of an electropneumatic modulator to be received in merely two chambers. Specific housings for the individual components are advantageously not necessary. The housing presented here is very simple and can be conveniently produced in one piece, for example by a molding method, in, for example, a mold. When the electropneumatic modulator is mounted, only a very small number of mounting steps are required. The housing presented here can have an essentially H-shaped form in cross-section, wherein the electric chamber and the receptacle chamber can be separated by a separating web or a separating plate of the H-shaped housing cross section. An upper side of the separating plate can form here an electric chamber floor of the electric chamber, and the opposite underside of the separating plate can form a receptacle chamber floor of the receptacle chamber. At ends of the two chambers, lying respectively opposite the separating plate, the housing has a receptacle opening for each of the two chambers.

A diameter of the receptacle chamber floor of the receptacle chamber can be smaller than a diameter of the receptacle opening of the receptacle chamber. When the relay piston and the guide device are mounted into the housing, these can therefore be received in a practical manner successively, for example one on top of the other, in the receptacle chamber.

It is also advantageous if according to one embodiment the receptacle chamber forms a piston chamber section which is formed so as to receive the relay piston and forms a guide chamber section which is formed so as to at least partially receive the guide device, wherein the piston chamber section can adjoin the receptacle chamber floor of the receptacle chamber, and the guide chamber section can be arranged facing a receptacle opening of the receptacle chamber. Additionally or alternatively, a diameter of the piston chamber section can be smaller than a diameter of the guide chamber section. Forming the receptacle chamber in such a way permits the relay piston to be firstly stacked easily onto the receptacle chamber floor of the receptacle chamber and then a wider guide device into, for example, a central region of the receptacle chamber. The guide chamber section can for this purpose be shaped so as to additionally receive a silencer which can be received in the receptacle chamber, for example after the guide device during mounting.

The piston chamber section can be configured in a cylindrical shape, and additionally or alternatively the guide chamber section can have at least one oblique wall. The guide chamber section can have, for example, a frustrum-shaped section which can be formed so that it widens in the direction of the receptacle opening of the receptacle chamber. The cylindrical piston chamber section is suitable for the provided reciprocating movement of the relay piston as well as a seal of the relay piston against the side walls of the piston chamber section. The oblique formation of the guide chamber section permits a securing insert which widens to form a silencer to be received.

The housing can additionally form a pressure outlet duct which can be fluidically connected to the piston chamber section and additionally or alternatively form a supply connection duct which can be fluidically connected to the guide chamber section, and additionally or alternatively form a pneumatic guide inlet duct which can be fluidically connected to the electric chamber. The pressure outlet duct can make a connection to the brake system possible. The pneumatic control inlet duct can also be referred to as a backup duct. The pneumatic control inlet duct can make possible a connection to a pneumatic control device such as a foot-operated brake device. The supply connection duct can make possible a connection to a compressed air supply container. The duct or ducts which open into the receptacle chamber can be arranged so as to run straight through a wall of the housing. The ducts which open into the receptacle chamber can be arranged running parallel to one another, and be additionally or alternatively arranged perpendicularly with respect to a piston movement which is provided during the operation of the modulator. At least half of the pneumatic control inlet duct can also be arranged parallel to the ducts which open into the receptacle chamber. Such ducts are very easy to produce by, for example, at least one drilled hole, or already in the molding process.

The housing can additionally or alternatively have at least one connection duct which fluidically connects the electric chamber to the guide chamber section of the receptacle chamber. This guide duct can be arranged running straight and additionally or alternatively running perpendicularly with respect to the chamber floors. A connection duct which is arranged in such a compact fashion and can be produced merely by a straight drilled hole is made possible thanks to the receptacle chamber which runs in a tapering manner toward the receptacle chamber floor of the receptacle chamber.

It is also advantageous if the guide chamber section forms, according to one exemplary embodiment, an undercut and additionally or alternatively a recess. This undercut can serve to latch in a latching clip or a snap-action hook or a bayonet of a component of the electropneumatic modulator which can be arranged in front of the silencer. For example, the securing insert with the integrated guide sleeve can have such a securing element which can be latched or turned in a positively locking manner into the undercut of the housing. The guide chamber section can also form a guide groove which is connected to the undercut and has the purpose of inserting the bayonet into the undercut. The recess can serve to receive an edge section of a locking ring such as a snap ring. The undercut and additionally or alternatively the recess can be integrally formed all around into a receptacle chamber wall of the receptacle chamber. Such a snap ring, or possible latching in the undercut, can advantageously ensure that the guide ring is received in a stable manner in the receptacle chamber. Therefore, it is possible to prevent the guide device from moving toward the receptacle opening of the receptacle chamber, for example during the operation of the modulator.

An intermediate chamber section can be arranged between the piston chamber section and the guide chamber section, said intermediate chamber section being formed in such a way as to receive the inlet seat ring of the guide device. This intermediate chamber section can form a shoulder which can form a stop for the inlet seat ring of the guide device. A diameter of the intermediate chamber section can be larger than the diameter of the piston chamber section, and additionally or alternatively the diameter of the individual chamber section can be smaller than the diameter of the guide chamber section. Thanks to such an intermediate chamber section, the guide device can be prevented from moving toward the relay piston or the receptacle chamber floor of the receptacle chamber, for example during the operation of the modulator.

According to one embodiment, the housing has, on the receptacle chamber floor of the receptacle chamber, a centering rod which projects into the receptacle chamber and has the purpose of receiving the relay piston in a centered manner. The centering rod can be a centering sleeve. The centering rod can be arranged centrally on the receptacle chamber floor of the receptacle chamber, and additionally or alternatively serve to guide the relay piston during operation. For this purpose, the centering rod can be received in an opening in the relay piston during the operation of the modulator.

An electropneumatic modulator has at least one electrical and additionally or alternatively electronic component, a relay piston, a guide device for guiding the relay piston and a housing which is formed in a variant as presented above. The electrical and additionally or alternatively electronic component is received in the electric chamber of the housing, and the relay piston and the guide device are received in the receptacle chamber of the housing. An electropneumatic modulator which is presented here can be formed for use with a brake system for a vehicle. Thanks to the single-piece housing device and the arrangement and formation of the electric chamber and of the receptacle chamber, the electropneumatic modulator can advantageously be mounted quickly and easily.

A method for producing an electropneumatic modulator has a provision step, an insertion step and an introduction step. In the provision step, one of the housings presented above is provided. In the insertion step, the electrical and additionally or alternatively electronic component is inserted into the electric chamber of the housing from the first side of the housing. In the introduction step, the relay piston and the guide device are introduced into the receptacle chamber of the housing from the second side of the housing, in order to produce the electropneumatic modulator.

Exemplary embodiments of the approach presented here are explained in more detail in the following description with respect to the figures.

DETAILED DESCRIPTION

In the following description of favorable exemplary embodiments of the present approach, identical or similar reference numbers are used for the elements which are illustrated in the various figures and act similarly, with a repeated description of these elements being refrained from.

Figure 1:
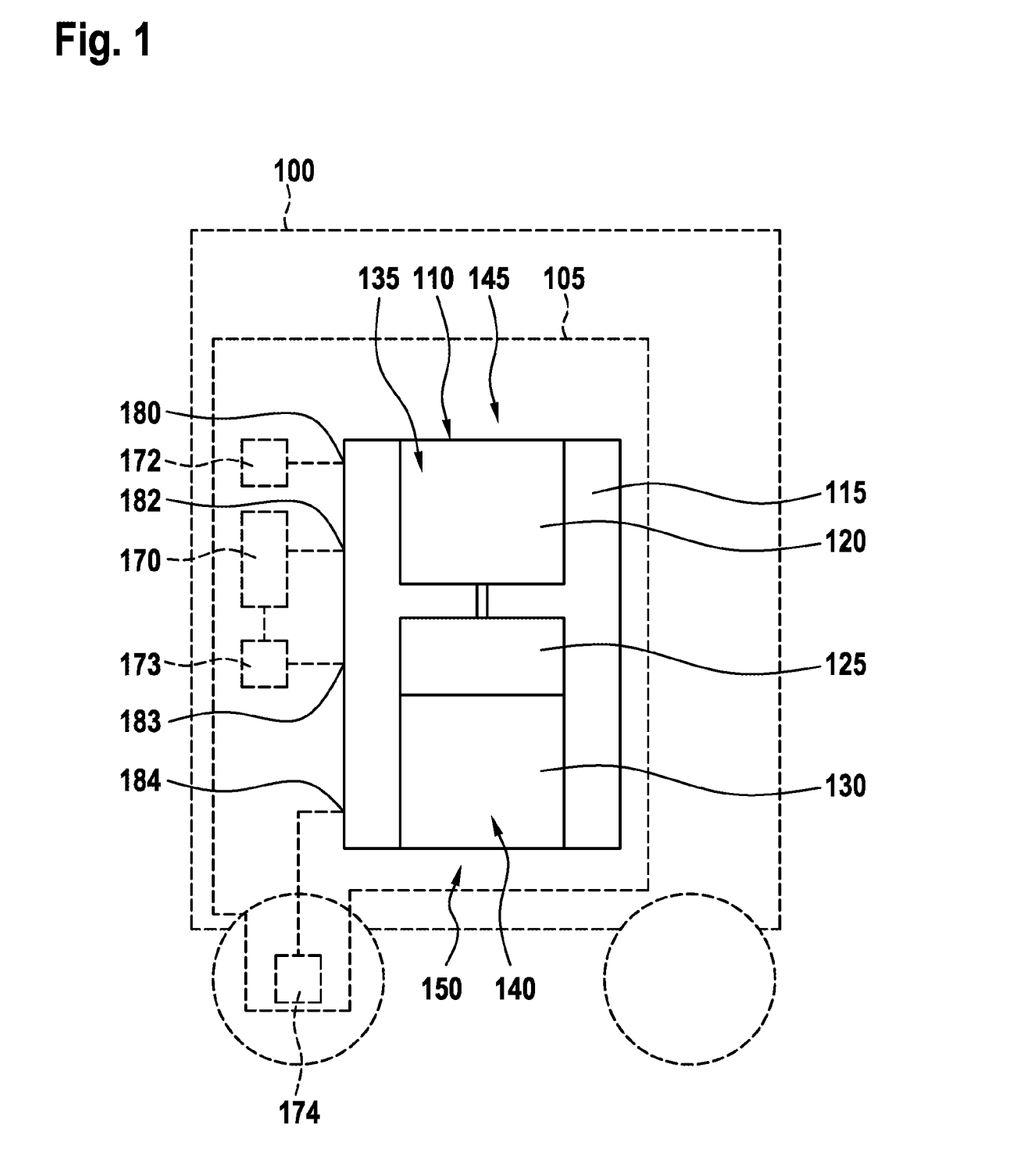
FIG. 1 shows a schematic lateral cross-sectional illustration of a vehicle with a brake system with an electropneumatic modulator with a housing according to an exemplary embodiment.

FIG. 1 shows a schematic lateral cross-sectional illustration of a vehicle 100 with a brake system 105 with an electropneumatic modulator 110 with a housing 115 according to an exemplary embodiment.

The electropneumatic modulator 105 has the housing 115, at least one electrical and/or electronic component 120, a relay piston 125 and a guide device 130, which is shaped so as to guide the relay piston 125.

The housing 115 of the electropneumatic modulator 110 has an electric chamber 135 and a receptacle chamber 140. The electric chamber 135 is shaped so as to receive the at least one electrical and/or electronic component 120 of the electropneumatic modulator 110 from a first side 145 of the housing 115. The receptacle chamber 140 is arranged opposite the electric chamber 135 and shaped so as to receive the relay piston 125 and the guide device 130 from a second side 150 lying opposite the first side 145, of the housing 115. The housing 115 is shaped in one piece.

In an operationally ready state of the electropneumatic modulator 110 which is shown here, the electrical and/or electronic component 120 is received in the electric chamber 135, and the relay piston 125 and the guide device 130 are received in the receptacle chamber 140.

The electropneumatic modulator 110 according to the exemplary embodiment shown is for example merely part of the brake system 105 of the vehicle 100. The brake system 105 comprises, in addition to the modulator 110, for example a supply container 170 for providing compressed air, an electrical control device 172 for providing an electrical control signal, a foot-operated brake device 173 for providing a pneumatic control signal, and a wheel brake device 174 for braking a wheel of the vehicle 100. The functionality of the modulator 110 corresponds, according to one exemplary embodiment, to the functionality of known electropneumatic modulators which are used in conjunction with brake systems.

The electropneumatic modulator 110 has, according to one exemplary embodiment, an electrical control input 180 for receiving the electrical control signal from the electrical control device 172, a supply connection 182 for feeding in the compressed air from the supply container 170, a pneumatic control inlet 183 for feeding in the compressed air from the supply container 170 in response to the pneumatic control signal, and a brake outlet 184 for outputting a brake pressure to the wheel brake device 174.

The wheel brake device 174 can be embodied in accordance with a brake which is customary in the field of vehicles, and can comprise, for example, a brake cylinder which can be activated by the brake pressure. The electrical control signal represents, according to one exemplary embodiment, an electrical signal. For example, the electrical control signal can display a requested setpoint brake pressure. In this case, the electrical control device 172 is embodied, for example, as a brake control device, and the electropneumatic modulator 110 comprises at least one solenoid valve, for example as the electrical and/or electronic component 120, which solenoid valve can be activated using the electrical control signal or a signal which is generated in response to reception of the electrical control signal.

According to one exemplary embodiment, the receptacle chamber 140 comprises a control chamber section to which compressed air which is fed in can be applied and controlled by the electrical control signal, in order to bring about a switching movement of the relay piston 125. The receptacle chamber 140 also comprises, according to one exemplary embodiment, a working chamber section which is fluidically connected to the brake outlet 184 and to which compressed air which is fed in via the supply connection 182 can be applied by the switching movement of the relay piston 125, in order to provide brake pressure at the brake outlet 184.

The approach which is presented here implements a configuration of an electropneumatic modulator 110 in a single-part housing form in the form of the housing 115.

The production of the housing 115 presented here advantageously requires only a small number of molds. Additional parts such as seals for sealing different housing parts or screws for securing different housing parts to one another are therefore not necessary thanks to the single-part housing 115. Since it is not necessary to seal air ducts between different housing parts, a very small number of sealing geometries or no sealing geometries and/or simple sealing geometries can be used for a housing seal. The production of the housing 115 as well as the production or mounting of the electropneumatic modulator 110 require only a very small number of mounting steps, which are at the same time simple steps. A centering of the parts of the electropneumatic modulator 110 with respect to one another is advantageously carried out automatically during the mounting as a result of the shaping of the housing 115, see in this respect also the following figures. The housing 115 does not implement any tolerances, or only few tolerances, as a result of which the parts advantageously have no or only a small offset with respect to one another. A different compression of seals does not occur, or only occurs to a small degree, thanks to the housing 115 which is presented here.

Figure 2:
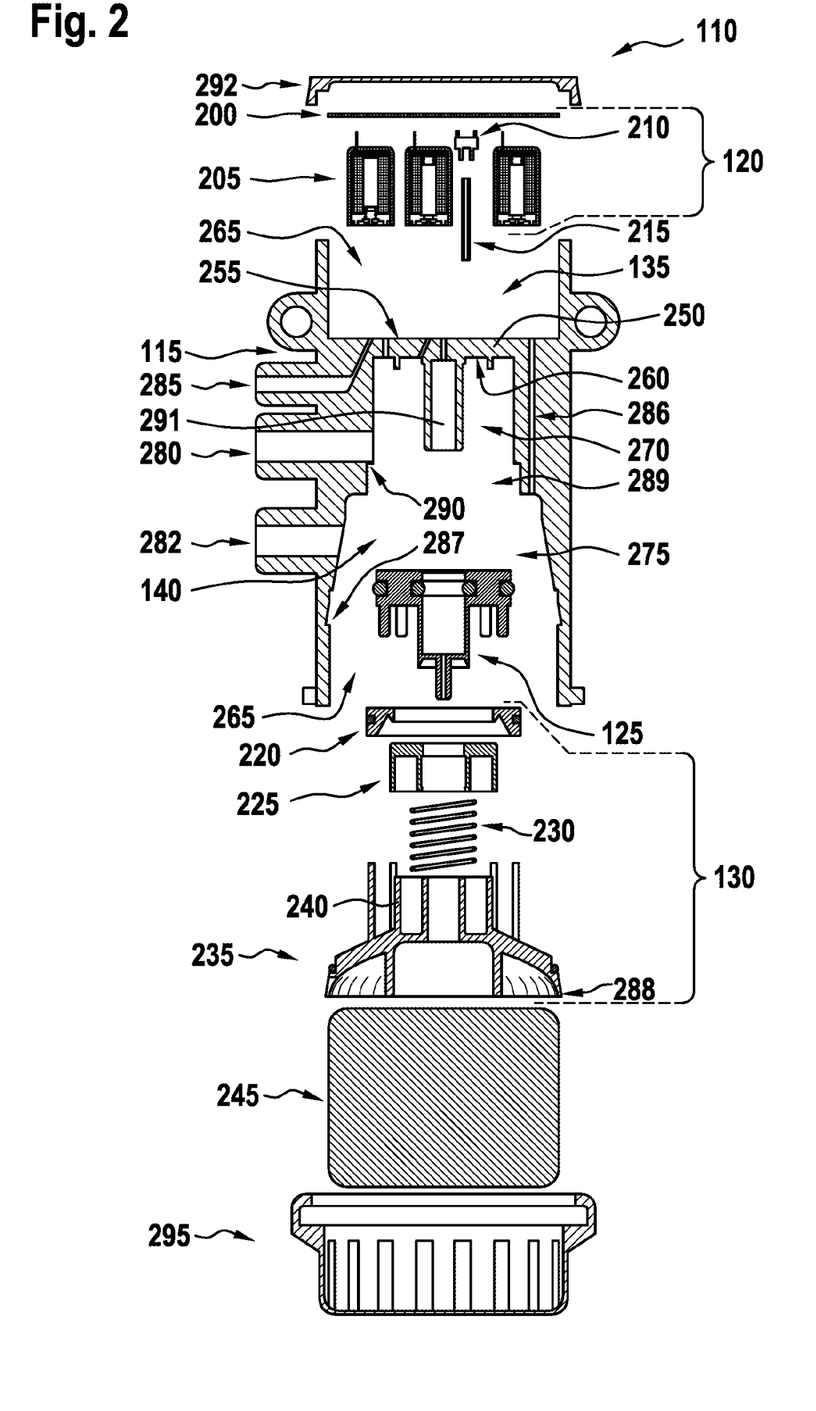
FIG. 2 shows a schematic lateral exploded view in the cross section of an electropneumatic modulator with a housing according to an exemplary embodiment.

FIG. 2 shows a schematic lateral exploded illustration in the cross section of an electropneumatic modulator 110 with a housing 115 according to an exemplary embodiment. This can be an exemplary embodiment of the electropneumatic modulator 110 which is described on the basis of FIG. 1.

According to this exemplary embodiment, the electropneumatic modulator 110 comprises a multiplicity of electrical and/or electronic components 120 in the form of a circuit board 200, merely by way of example three solenoid valves 205, a pressure sensor 210 and/or a pressure tube 215. The guide device 130 comprises, according to this exemplary embodiment, an inlet seat ring 220, a collar 225, a collar spring 230 and/or a securing insert 235 with an integrated guide sleeve 240. According to this exemplary embodiment, the electropneumatic modulator 110 also has a silencer 245 in the form of a knitted silencer fabric. According to this exemplary embodiment, the receptacle chamber 140 is formed so as to accommodate at least one section of the silencer 245.

The housing 115 has, in the cross section illustrated here, an essentially H-shaped formation, wherein the electric chamber 135 and the receptacle chamber 140 are separated by a separating web or a separating plate 250 of the H-shaped housing cross section. An upper side of the separating plate 250 forms here an electric chamber floor 255 of the electric chamber 135, and the opposite underside of the separating plate 250 has a receptacle chamber floor 260 of the receptacle chamber 140. The electric chamber floor 255 and the receptacle chamber floor 260 are oriented parallel to one another according to this exemplary embodiment. According to this exemplary embodiment, a diameter of the electric chamber floor 255 is larger than a diameter of the receptacle chamber floor 260. The housing 115 has a receptacle opening 265 of the two chambers 135, 140 at each end, lying opposite the separating plate 250 of the two chambers 135, 140. According to this exemplary embodiment, the receptacle openings 265 of the two chambers 135, 140 have essentially an identical or similar diameter. According to this exemplary embodiment, the diameter of the receptacle chamber floor 260 is smaller than a diameter of the receptacle opening 265 of the receptacle chamber 140.

According to this exemplary embodiment, the electric chamber 135 is formed in a cylindrical shape. The three solenoid valves 205 can be arranged one next to the other in the electric chamber 135.

According to this exemplary embodiment, the receptacle chamber 140 forms a piston chamber section 270 which is formed so as to receive the relay piston 125 and forms according to this exemplary embodiment a guide chamber section 175 which is formed so as to at least partially receive the guide device 230, wherein the piston chamber section 270 adjoins the receptacle chamber floor 260, and the guide chamber section 275 is arranged facing the receptacle opening 265 of the receptacle chamber 140. According to this exemplary embodiment, a diameter of the piston chamber section 270 is smaller than a diameter of the guide chamber section 275. According to this exemplary embodiment, the piston chamber section 270 is formed in a cylindrical shape. According to this exemplary embodiment, the guide chamber section 275 has at least one oblique wall.

According to this exemplary embodiment, the housing 115 has a pressure outlet duct 280 which is fluidically connected to the piston chamber section 270 and/or forms a supply connection duct 282 which is fluidically connected to the guide chamber section 275 and/or forms a pneumatic control inlet duct 285 which is fluidically connected to the electric chamber 135. According to this exemplary embodiment, the pressure outlet duct 280 comprises the brake outlet which is described in FIG. 1, and the pneumatic control inlet duct comprises, according to this exemplary embodiment, the pneumatic control inlet which is described in FIG. 1, and/or the supply connection duct 282 comprises, according to this exemplary embodiment, the supply connection which is described in FIG. 1. The pressure outlet duct 280 and/or the supply connection duct 282 is formed in a straight manner according to this exemplary embodiment. The pressure outlet duct 280 and the supply connection duct 282 are arranged parallel to one another according to this exemplary embodiment. According to this exemplary embodiment, the pressure outlet duct 280 and the supply connection duct 282 are arranged perpendicular to a piston movement provided during the operation of the modulator 110, of the relay piston 125. According to this exemplary embodiment, at least one half of the pneumatic control inlet duct 285 is also arranged running parallel to the ducts 280, 282 which open into the receptacle chamber 140, below a plane of the electric chamber floor 255, wherein a further half of the pneumatic control inlet duct 285 is arranged obliquely and/or opens into the electric chamber floor 255.

According to this exemplary embodiment, the housing 115 has at least one connection duct 286 which fluidically connects the electric chamber 135 to the guide chamber section 275 of the receptacle chamber 140. According to this exemplary embodiment, this connection duct 286 is arranged running straight and/or running perpendicularly with respect to the chamber floors 255, 260.

The guide chamber section 275 forms, according to this exemplary embodiment, an undercut 287. This undercut 287 is formed in such a way that in a mounted state of the modulator 110 it latches, according to this exemplary embodiment, with a latching clip 288 or, according to an alternative exemplary embodiment, with a bayonet or a snap-action hook of a component of the electropneumatic modulator 110 which is arranged upstream of the silencer 245. According to this exemplary embodiment, the securing insert 235 has at least one latching clip 288 at an end facing the silencer 245. According to the alternative exemplary embodiment, the securing insert 235 has the bayonet which can be latched and/or turned in a positively engaging manner into the undercut 287. According to this exemplary embodiment, the undercut 287 is integrally formed all around a receptacle chamber wall of the receptacle chamber 140 and is formed so as to secure the guide device 130 in the receptacle chamber 140. During the operation of the modulator 110, a movement of the guide device 130 toward the receptacle opening of the receptacle chamber 140 is therefore prevented in a positively locking manner.

According to this exemplary embodiment, the undercut 287 is arranged in a center or a third of a guide chamber wall, facing the receptacle opening 265 of the receptacle chamber 140, or of the guide chamber section 275. A final chamber section, arranged between the undercut 287 and the receptacle opening 265 of the receptacle chamber 140, of the guide chamber section 275 is configured in a cylindrical shape. According to an alternative exemplary embodiment, the end chamber section of the guide chamber section 275 forms a step or constriction which is shaped so as to bring about radial pressing of the silencer 245 when the latter is received in the modulator 110.

An intermediate chamber section 289, which is formed so as to receive the inlet seat ring 220 of the guide device 130, is arranged between the piston chamber section 270 and the guide chamber section 275. This intermediate chamber section 289 forms a shoulder 290 which forms a stop for the inlet seat ring 220 of the guide device 130. A diameter of the intermediate chamber section 289 is, according to this exemplary embodiment, larger be than the diameter of the piston chamber section 270 and/or the diameter of the intermediate chamber section 289 is, according to this exemplary embodiment, smaller than the diameter of the guide chamber section 275.

According to this exemplary embodiment, the housing 115 has, on the receptacle chamber floor 260, a centering rod 290 which projects into the piston chamber section 270 and is shaped so as to center the relay piston 125. The centering rod 290 is a centering sleeve according to this exemplary embodiment. The centering rod 290 is arranged centrally on the receptacle chamber floor 260 of the receptacle chamber and is shaped to guide the relay piston 125 during operation. The relay piston 125 has an opening into which the centering rod 290 is arranged received during the operation of the modulator 110.

According to this exemplary embodiment, the modulator 110 comprises an electric chamber cover 292 which is shaped so as to close the chamber opening 265 of the electric chamber 135. According to this exemplary embodiment, the modulator 110 comprises a receptacle chamber cover 295 which is shaped to close the chamber opening 265 of the receptacle chamber 140. During the operation of the modulator 110, the silencer 245 is arranged partially in the end chamber section of the guide chamber section 275 and partially in the receptacle chamber cover 295. The receptacle chamber cover 295 has at least one opening according to an exemplary embodiment.

Figure 3:
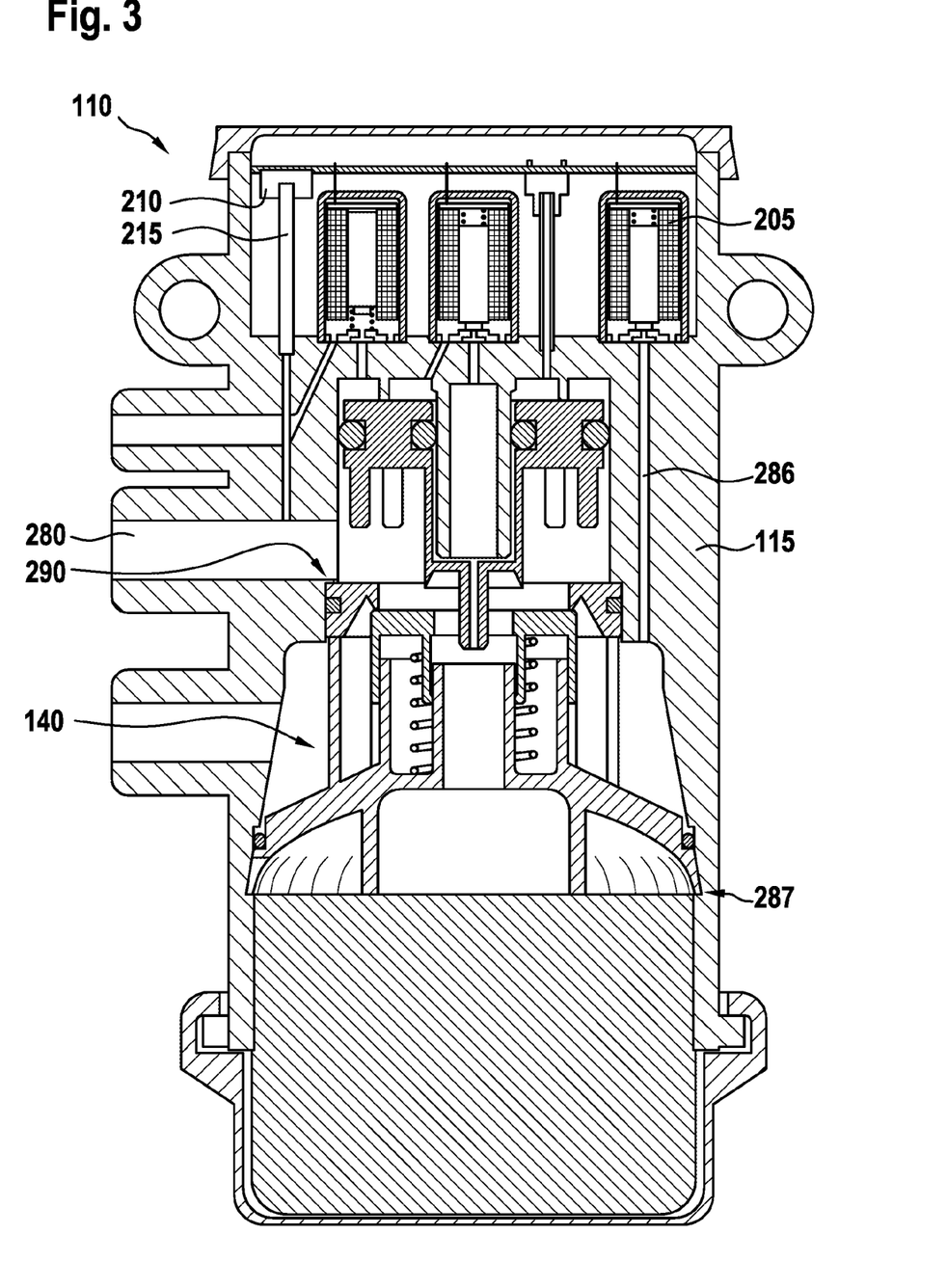
FIG. 3 shows a schematic lateral cross-sectional illustration of an electropneumatic modulator with a housing according to an exemplary embodiment.

FIG. 3 shows a schematic lateral cross-sectional illustration through an electropneumatic modulator 110 with a housing 115 according to an exemplary embodiment. The electropneumatic modulator 110 described with reference to FIG. 2 is in a mounted state.

The electropneumatic modulator 110 presented here has a single-part housing 115. The internal functional parts of the relay part are mounted from one side, according to this exemplary embodiment from below, and the electrical and electronic components such as the solenoid valves, pressure sensors, circuit board and pressure tubes are mounted from the opposite side. This is made possible through internal parts which become successively larger and which are inserted one after the other into the receptacle chamber 140 and which are supported, partially one on the other and partially on shoulders 289 in the housing 115. The electrical and electronic components are introduced, attached and contact is formed with them from the other side of the housing 115.

Thanks to the formation of the housing 115 presented here, in total few parts and therefore also few production tools such as molds are necessary. In addition, there is no need for a housing seal or for screwed connections of the housing 115. Overall, there are few tolerances, and easy mounting without centering of housing parts and seals is possible. Overall, only a very small number of mounting steps are necessary for the production of the housing 115 and the modulator 110. The modulator 110 implements a slim configuration and takes up only a small amount of installation space. According to this exemplary embodiment, the last internal part before the silencer latches with latching elements into the undercut of the housing 115 and therefore secures the other internal parts in position in conjunction with the shoulder 290 in the housing 115. According to an alternative exemplary embodiment, the last internal part before the silencer is secured with a bayonet in the housing 115. As a result of the upwardly tapering cavity of the receptacle chamber 140 in the housing 115, the connection duct 286 in the form of a simple, essentially perpendicular drilled connecting hole in the housing 115 between the supply space of the relay valve, and according to this exemplary embodiment, an inlet solenoid valve 205, is sufficient.

According to this exemplary embodiment, the pressure sensor 210 and/or the pressure tube 215 are configured and arranged so as to sense a pressure underneath the relay piston. The pressure tube 215 of the pressure sensor 210 opens for this purpose into the pressure outlet duct 280 or a connection duct to the pressure outlet duct according to this exemplary embodiment.

Figure 4:
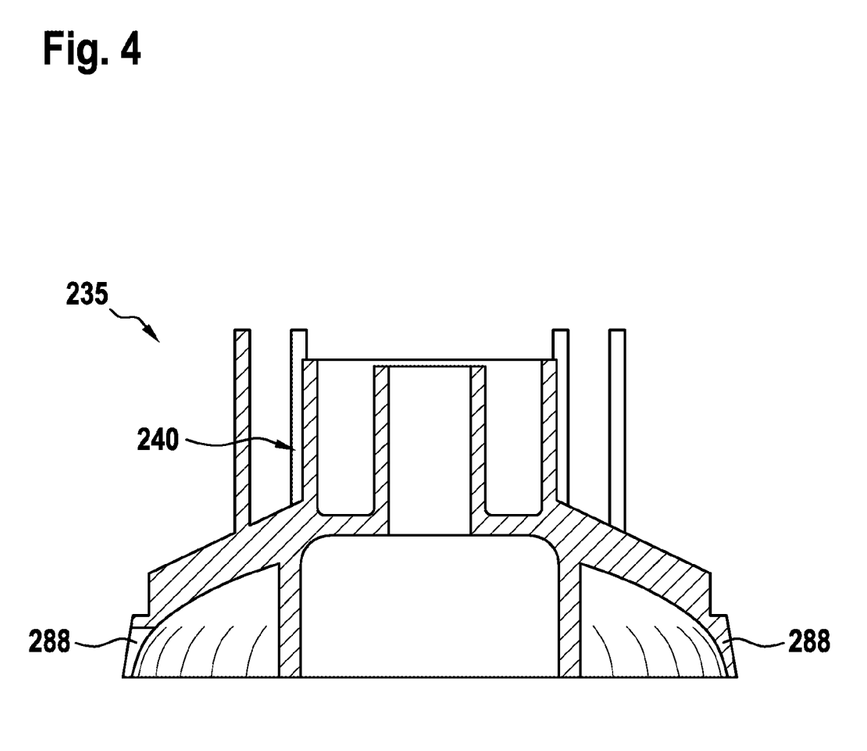
FIG. 4 shows a schematic lateral cross-sectional illustration of a securing insert with an integrated guide sleeve of an electropneumatic modulator according to an exemplary embodiment.

FIG. 4 shows a schematic lateral cross-sectional illustration of a securing insert 235 with an integrated guide sleeve 240 of an electropneumatic modulator 110 according to an exemplary embodiment. The securing insert 235 here can have an integrated guide sleeve 240 which has been described in one of FIGS. 2 to 3. The holding insert 235 is formed in one piece with the guide sleeve 240 according to this exemplary embodiment. An external diameter of the guide sleeve 240 is, according to this exemplary embodiment, smaller than a distance from a latching clip 288 up to a latching clip 288 lying opposite.

Figure 5:
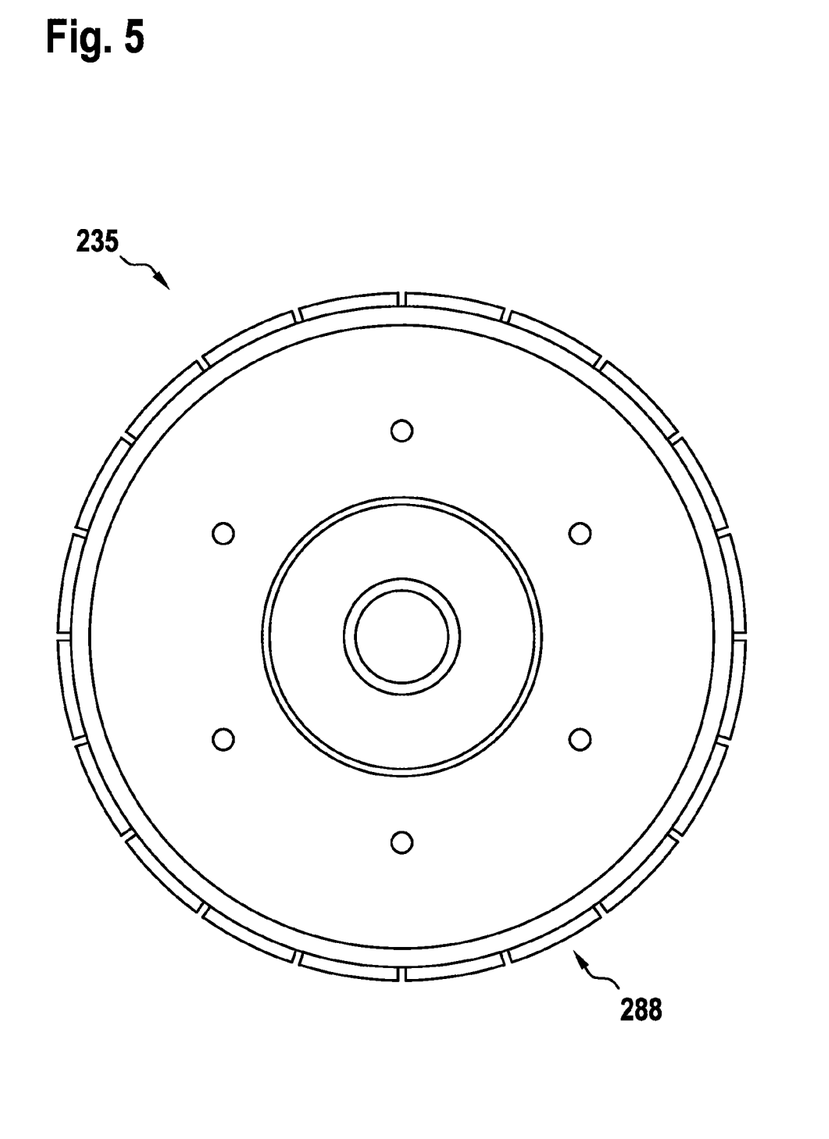
FIG. 5 shows a schematic bottom view of a securing insert with an integrated guide sleeve of an electropneumatic modulator according to an exemplary embodiment.

FIG. 5 shows a schematic bottom view of a securing insert 235 with an integrated guide sleeve of an electropneumatic modulator 110 according to an exemplary embodiment. The securing insert 235 which is described in FIG. 4 can have an integrated guide sleeve here. At an end lying opposite the guide sleeve, a multiplicity of latching clips 288 are arranged all around a circular edge of the securing insert 235. According to this exemplary embodiment, the edge has, for example, twenty latching clips 288 which are arranged spaced evenly apart from one another all around the edge.

Figure 6:
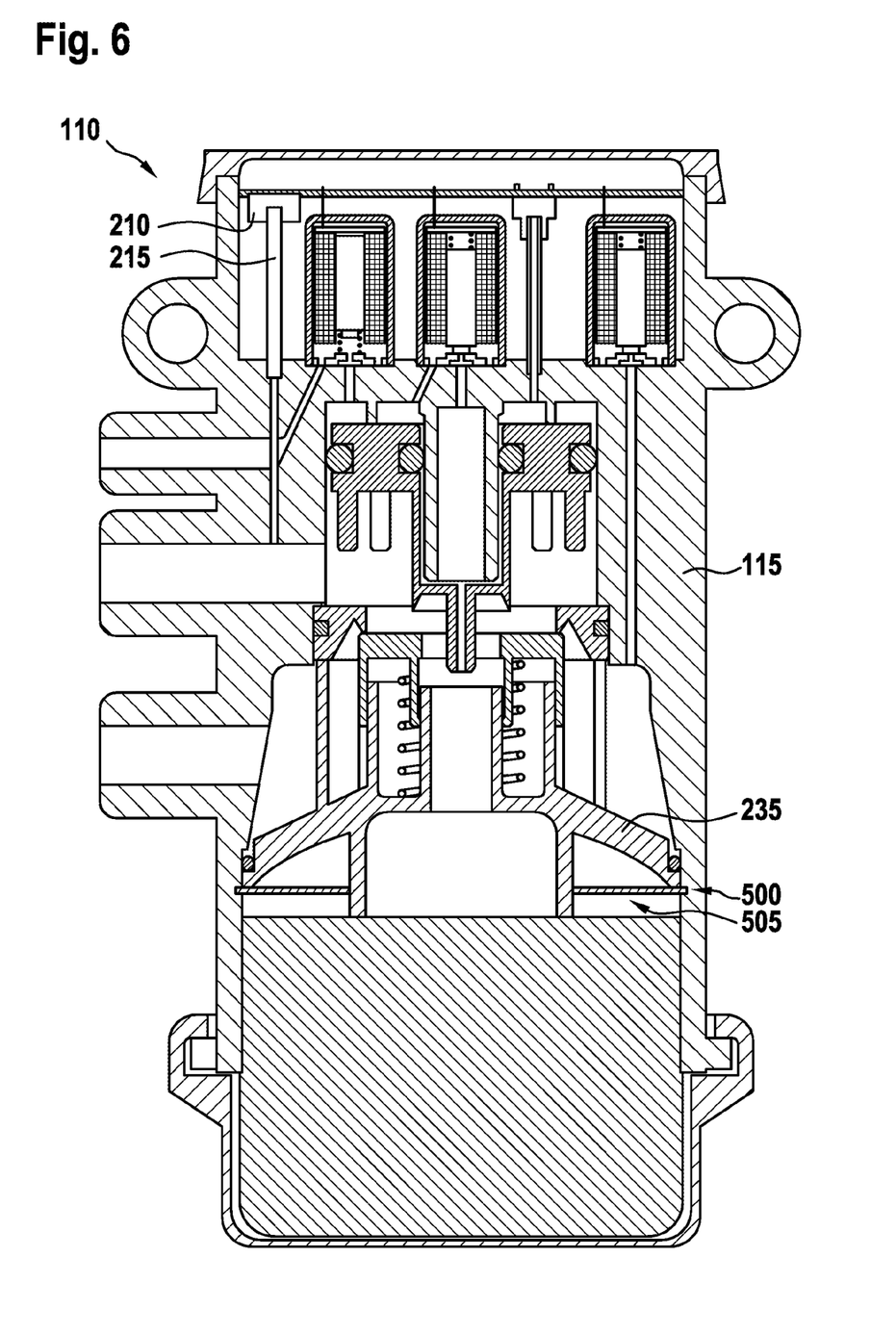
FIG. 6 shows a schematic illustration of an electropneumatic modulator with a housing according to an exemplary embodiment.

FIG. 6 shows a schematic illustration of an electropneumatic modulator 110 with a housing 115 according to an exemplary embodiment. The modulator 110 here can be the one described in FIG. 3, with the difference that the guide chamber section 275 according to this exemplary embodiment forms a recess 500 instead of the undercut.

According to this exemplary embodiment, the securing insert 235 does not have the latching clips. The securing insert 235 or the modulator 110 has, according to this exemplary embodiment a snap ring 505 which has a larger diameter than the securing insert 235. According to this exemplary embodiment, the recess 500 is integrally formed on or around the receptacle chamber wall and/or perpendicularly with respect to the receptacle chamber wall of the receptacle chamber, for example as a circumferential groove. A circumferential edge section of the snap ring 505 is received in the recess 500 according to this exemplary embodiment. The last internal part in front of the silencer is therefore secured by the snap ring 505 in the recess 500 in the housing 115.

Figure 7:
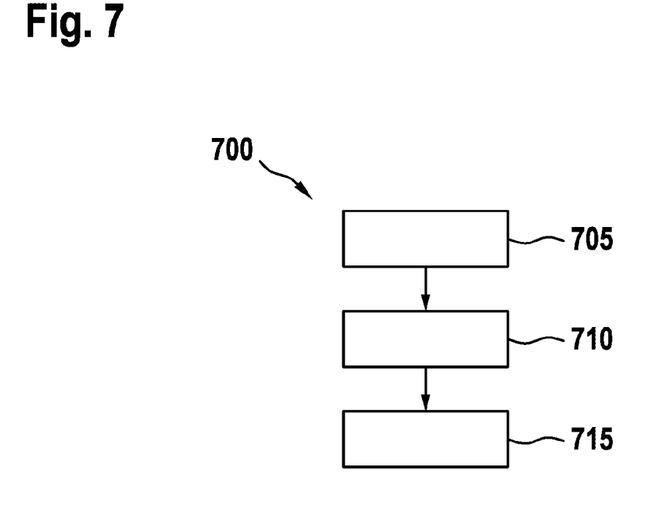
FIG. 7 shows a flow diagram of a method for producing an electropneumatic modulator according to an exemplary embodiment.

FIG. 7 shows a flow diagram of a method 700 for producing an electropneumatic modulator according to an exemplary embodiment. This can be one of the modulators described in FIG. 1 to 3 or 6.

The method 700 has a provision step 705, an insertion step 710 and an introduction step 715. In the provision step 705, the housing is provided. In the insertion step 705 the electrical and additionally or alternatively electronic component is inserted into the electric chamber of the housing from the first side of the housing. In the introduction step 710, the relay piston and the guide device are introduced into the receptacle chamber of the housing from the second side of the housing, in order to produce the electropneumatic modulator.

The steps 710, 715 of insertion and introduction can be carried out simultaneously or with staggered time. The insertion step 710 can be carried out before or after the introduction step 715.

This method can be implemented, for example, using software or hardware or in a mixed form composed of software and hardware, for example in a control device.

If an exemplary embodiment comprises an "and/or" conjunction between a first feature and a second feature, this is to be understood as meaning that the exemplary embodiment has both the first feature and the second feature in one form and either only the first feature or the second feature in another form.

THE LIST OF REFERENCE NUMBERS IS AS FOLLOWS

100 Vehicle
105 Brake system
110 Electropneumatic modulator
115 Housing
120 Electrical and/or electronic component
125 Relay piston
130 Guide device
135 Electric chamber
140 Receptacle chamber 145 First side
150 Second side
170 Supply container
172 Electrical control device
173 Foot-operated brake device
174 Wheel brake device
180 Electrical control input
182 Supply connection
183 Pneumatic control inlet
184 Brake outlet
200 Circuit board
205 Solenoid valves
210 Pressure sensor
215 Pressure tube
220 Inlet seat ring
225 Collar
230 Collar spring
235 Securing insert
240 Guide sleeve
245 Silencer
250 Separating plate
255 Electronic chamber floor
260 Receptacle chamber floor
265 Receptacle opening
270 Piston chamber section
275 Guide chamber section
280 Pressure outlet duct
282 Supply connection duct
285 Pneumatic control inlet duct
286 Connection duct
287 Undercut
288 Latching clip
289 Intermediate chamber section
290 Shoulder
291 Centering rod
292 Electric chamber cover
295 Receptacle chamber cover
500 Recess
505 Snap ring
700 Method for producing an electropneumatic modulator
705 Provision step
710 Insertion step
715 Introduction step

The invention claimed is:

1. A housing for an electropneumatic modulator for an electropneumatic brake system for a vehicle, comprising:
an electric chamber to receive at least one electrical and/or electronic component of the electropneumatic modulator from a first side of the housing; and
a receptacle chamber which is arranged opposite the electric chamber and is configured so as to receive a relay piston and a guide device for guiding the relay piston from a second side, opposite the first side, of the housing, wherein the housing is formed in one piece;
wherein the electropneumatic modulator includes a silencer, and wherein the receptacle chamber is formed so as to accommodate at least one section of the silencer,
wherein a diameter of an electric chamber floor is larger than a diameter of a receptacle chamber floor, wherein the housing has a receptacle opening of the electric chamber and the receptacle chamber at each end, lying opposite a separating plate of the electric chamber and the receptacle chamber, wherein the receptacle opening of the electric chamber and the receptacle chamber have essentially an identical or approximately same diameter, and wherein a diameter of the receptacle chamber floor is smaller than a diameter of the receptacle opening of the receptacle chamber, and
wherein the receptacle chamber forms a piston chamber section which is formed to receive the relay piston and forms a guide chamber section which is formed so as to at least partially receive the guide device, and wherein the piston chamber section adjoins the receptacle chamber floor of the receptacle chamber, and the guide chamber section is arranged facing a receptacle opening of the receptacle chamber, and a diameter of the piston chamber section is smaller than a diameter of the guide chamber section.

2. The housing of claim 1, wherein the piston chamber section is in a cylindrical shape, and/or wherein the guide chamber section has at least one oblique wall.

3. The housing of claim 1, wherein the housing forms a pressure outlet duct which is fluidically connected to the piston chamber section and/or forms a supply connection duct which is fluidically connected to the guide chamber section and/or forms a pneumatic control inlet duct which is fluidically connected to the electric chamber.

4. The housing of claim 1, further comprising:
at least one connection duct which fluidically connects the electric chamber to the guide chamber section of the receptacle chamber.

5. The housing of claim 1, wherein the guide chamber section forms an undercut and/or a recess.

6. The housing of claim 1, further comprising:
an intermediate chamber section arranged between the piston chamber section and the guide chamber section and is configured to receive an inlet seat ring of the guide device.

7. The housing of claim 6, wherein the intermediate chamber section forms a shoulder which forms a stop for the inlet seat ring of the guide device.

8. The housing of claim 1, further comprising:
a centering rod, on a receptacle chamber floor of the receptacle chamber, wherein the centering rod projects into the receptacle chamber and is configured to receive the relay piston in a centered manner.

9. An electropneumatic modulator, comprising:
at least one electrical and/or electronic component;
a relay piston;
a guide device for guiding the relay piston; and
a housing including:
an electric chamber configured to receive at least one electrical and/or electronic component of the electropneumatic modulator from a first side of the housing; and
a receptacle chamber which is arranged opposite the electric chamber and is configured so as to receive a relay piston and a guide device for guiding the relay piston from a second side, opposite the first side, of the housing, wherein the housing is formed in one piece;
wherein the electrical and/or electronic component is received in the electric chamber of the housing, and wherein the relay piston and the guide device are received in the receptacle chamber of the housing;
wherein the electropneumatic modulator includes a silencer, and wherein the receptacle chamber is formed so as to accommodate at least one section of the silencer,
wherein a diameter of an electric chamber floor is larger than a diameter of a receptacle chamber floor, wherein the housing has a receptacle opening of the electric chamber and the receptacle chamber at each end, lying opposite a separating plate of the electric chamber and the receptacle chamber, wherein the receptacle opening of the electric chamber and the receptacle chamber have essentially an identical or approximately same diameter, and wherein a diameter of the receptacle chamber floor is smaller than a diameter of the receptacle opening of the receptacle chamber, and wherein the receptacle chamber forms a piston chamber section which is formed to receive the relay piston and forms a guide chamber section which is formed so as to at least partially receive the guide device, and wherein the piston chamber section adjoins the receptacle chamber floor of the receptacle chamber, and the guide chamber section is arranged facing a receptacle opening of the receptacle chamber, and a diameter of the piston chamber section is smaller than a diameter of the guide chamber section.

10. A method for producing an electropneumatic modulator, the method comprising:
   providing a housing, wherein the housing includes:
      an electric chamber configured to receive at least one electrical and/or electronic component of the electropneumatic modulator from a first side of the housing; and
      a receptacle chamber which is arranged opposite the electric chamber and is configured so as to receive a relay piston and a guide device for guiding the relay piston from a second side, opposite the first side, of the housing, wherein the housing is formed in one piece;
   inserting the electrical and/or electronic component into the electric chamber of the housing from the first side of the housing; and
   introducing the relay piston and the guide device into the receptacle chamber of the housing from the second side of the housing to produce the electropneumatic modulator;

wherein the electropneumatic modulator includes a silencer, and wherein the receptacle chamber is formed so as to accommodate at least one section of the silencer, wherein a diameter of an electric chamber floor is larger than a diameter of a receptacle chamber floor, wherein the housing has a receptacle opening of the electric chamber and the receptacle chamber at each end, lying opposite a separating plate of the electric chamber and the receptacle chamber, wherein the receptacle opening of the electric chamber and the receptacle chamber have essentially an identical or approximately same diameter, and wherein a diameter of the receptacle chamber floor is smaller than a diameter of the receptacle opening of the receptacle chamber, and wherein the receptacle chamber forms a piston chamber section which is formed to receive the relay piston and forms a guide chamber section which is formed so as to at least partially receive the guide device, and wherein the piston chamber section adjoins the receptacle chamber floor of the receptacle chamber, and the guide chamber section is arranged facing a receptacle opening of the receptacle chamber, and a diameter of the piston chamber section is smaller than a diameter of the guide chamber section.

* * * * *